United States Patent [19]

Schmid

[11] Patent Number: 5,793,506
[45] Date of Patent: Aug. 11, 1998

[54] OPTICAL TRANSMISSION SYSTEM FOR CABLE TELEVISION SIGNALS AND VIDEO AND TELECOMMUNICATIONS SIGNALS

[75] Inventor: Wolfgang Schmid, Esslingen, Germany

[73] Assignee: Alcatel N.V., Rijswijk, Netherlands

[21] Appl. No.: 601,731

[22] Filed: Feb. 15, 1996

[30] Foreign Application Priority Data

Feb. 18, 1995 [DE] Germany .................. 195 05 578.0

[51] Int. Cl.$^6$ ..................................... H04J 14/02
[52] U.S. Cl. ..................... 359/125; 359/123; 359/167
[58] Field of Search ........................... 359/114, 115, 359/117, 118, 120, 121, 123, 124, 125, 167, 137

[56] References Cited

U.S. PATENT DOCUMENTS

| | | | |
|---|---|---|---|
| 4,949,170 | 8/1990 | Yanagidaira et al. | 358/86 |
| 5,337,175 | 8/1994 | Ohnsorge et al. | 359/121 |
| 5,541,757 | 7/1996 | Fuse et al. | 359/125 |

FOREIGN PATENT DOCUMENTS 0386482  7/1990  European Pat. Off. ....... H04Q 11/00

OTHER PUBLICATIONS

Robert Olshansky, A Migration Path to BISDN, Aug. 1990 IEELCS pp. 30–34.

*Primary Examiner*—Rafael Bacares
*Attorney, Agent, or Firm*—Milton Oliver; Ware, Fressola, Van Der Sluys & Adolphson LLP

[57] ABSTRACT

Optical transmission systems in which interactive services, such as video-on-demand, are to be provided must be low in cost if the services are to find acceptance. This requires, among other things, that as little change to the structure of existing optical transmission systems as possible should be necessary.

In the optical transmission system according to the invention, a first frequency-division multiplex signal ($S_T$) is formed from subscriber-assigned video and telecommunications signals at a center (1). Cable television signals ($S_{TV}$) are transmitted with light of a first wavelength, and the first frequency-division multiplex signal ($S_T$) with light of a second wavelength, to at least one optical network termination (3). In the latter, the cable television signals ($S_{TV}$) and the video signals are combined into a third frequency-division multiplex signal. The third frequency-division multiplex signal and the telecommunications signals are combined into a second frequency-division multiplex signal ($S_S$), which is delivered at a port (22) of the optical network termination (3).

7 Claims, 4 Drawing Sheets

OPTICAL TRANSMISSION SYSTEM FOR CABLE TELEVISION SIGNALS AND VIDEO AND TELECOMMUNICATIONS SIGNALS

TECHNICAL FIELD

The present invention relates to an optical transmission system and to an optical network termination.

BACKGROUND OF THE INVENTION

An optical transmission system with a center and at least one optical network termination connected to the center by a fiber-optic network, a plurality of terminals connected to the optical network termination, and means at the center for optically transmitting cable television signals is known, for example, from L. Adnet et al. "Optoelektronik in der Teilnehmeranschlußleitung", Elektrisches Nachrichtenwesen (Alcatel), 4th Quarter 1992, pages 58 to 65. FIG. 1 of that article shows an optical transmission system in a general FTTB architecture. Cable-television and subscriber-assigned telecommunications signals are transmitted from a switching and distribution facility through a fiber-optic distribution network to a building in which several subscribers are located.

This optical transmission system consists of two subsystems: a narrow-band portion, with which subscriber-assigned telecommunications signals are transmitted, and a broadband portion for cable television signals to be distributed via the fiber-optic distribution network. The cable television signals are transmitted with light of a wavelength of 1550 nm, and the subscriber-assigned telecommunications signals are transmitted with light of a wavelength of 1300 nm; the narrow-band portion enables bidirectional transmission.

The building contains two optical network terminations: The optical network termination for the broadband system (BONT) is supplied with the cable television signal, and the optical network termination for the narrow-band system is supplied with the subscriber-assigned telecommunications signals.

The optical network terminations convert the received optical signals to corresponding electric signals, which are then transmitted to the subscribers through coaxial cables (cable television signal) or copper cables (subscriber-assigned telecommunication signal).

On the basis of such conventional optical transmission systems, attempts are currently being made to offer subscriber services which also provide interactive communication between service provider, network operator, and subscriber. Such an interactive service is a video-on-demand service, for example.

A transmission system which permits such a video-on-demand service is known from M. Yamashita et al, "Optical Video Transport/Distribution System with Video on Demand Service", SPIE, Vol. 1817, Optical Communications (1992), pages 12 to 22. The transmission system shown there has a ring-shaped distribution network. The subscriber-assigned video signals which have to be transmitted from the center (called "basic unit" there) to the subscribers of the cable television distribution network to deliver the video-on-demand service are transmitted as analog signals. The video signals are modulated onto respective subcarriers with different frequencies, the modulating subcarriers (37 subcarriers) are combined into a frequency-division multiplex signal, and the latter is transmitted with the cable television signals to optical network terminations ("ONUs") using wavelength-division multiplexing. Table 1 shows that several wavelengths must be used to enable a total of 400 cable television subscribers to access individual video programs.

Optical transmission systems in which interactive services are to be provided must be low in cost if the services are to find acceptance, i.e., in such optical transmission systems, high costs at the subscriber end must be avoided. This requires, among other things, that as little change to the structure of existing optical transmission systems as possible should be necessary. It is thus assumed that a considerable part of cable television distribution networks which stand a chance of being introduced anywhere in the near future will have the property that the fiber-optic distribution network does not extend to the subscribers' homes but ends at the curb in optical network terminations, from which an electrical access network extends to the subscribers.

SUMMARY OF THE INVENTION

It is an object of the invention to provide a low-cost optical transmission system for transmitting cable television signals and subscriber-assigned video and telecommunications signals. An optical transmission system attaining this object has a center and at least one optical network termination connected to the center by a fiber-optic network, a plurality of terminals connected to the optical network termination, and means at the center for optically transmitting cable television signals, wherein the center includes further means for combining subscriber-assigned video signals and subscriber-assigned telecommunications signals into a first frequency-division multiplex signal and transmitting the latter as an optical signal, and that the optical network termination includes a demultiplex and multiplex facility for combining the optically transmitted cable television signals and the optically transmitted first frequency-division multiplex signal into a second frequency-division multiplex signal which is transmitted to the terminals over an electrical access network.

It is another object of the invention to provide an optical network termination for an optical transmission system. An optical network termination attaining this object has a demultiplex and multiplex facility for combining optically transmitted cable television signals and an optically transmitted first frequency-division multiplex signal consisting of subscriber-assigned video signals and subscriber-assigned telecommunications signals into a second frequency-division multiplex signal, which appears at an output of the optical network termination.

One advantage of the invention is that in the optical network termination the electric signals are so combined that use can be made of conventional broadband TV amplifiers which are optimized for the respective frequency bands of the electric signals. Another advantage of the invention is that, in one embodiment, only one broadband TV amplifier is needed.

BRIEF DESCRIPTION OF THE DRAWINGS

The invention will now be explained in more detail with reference to the accompanying drawings, in which.

BEST MODE FOR CARRYING OUT THE INVENTION

Figure 1:
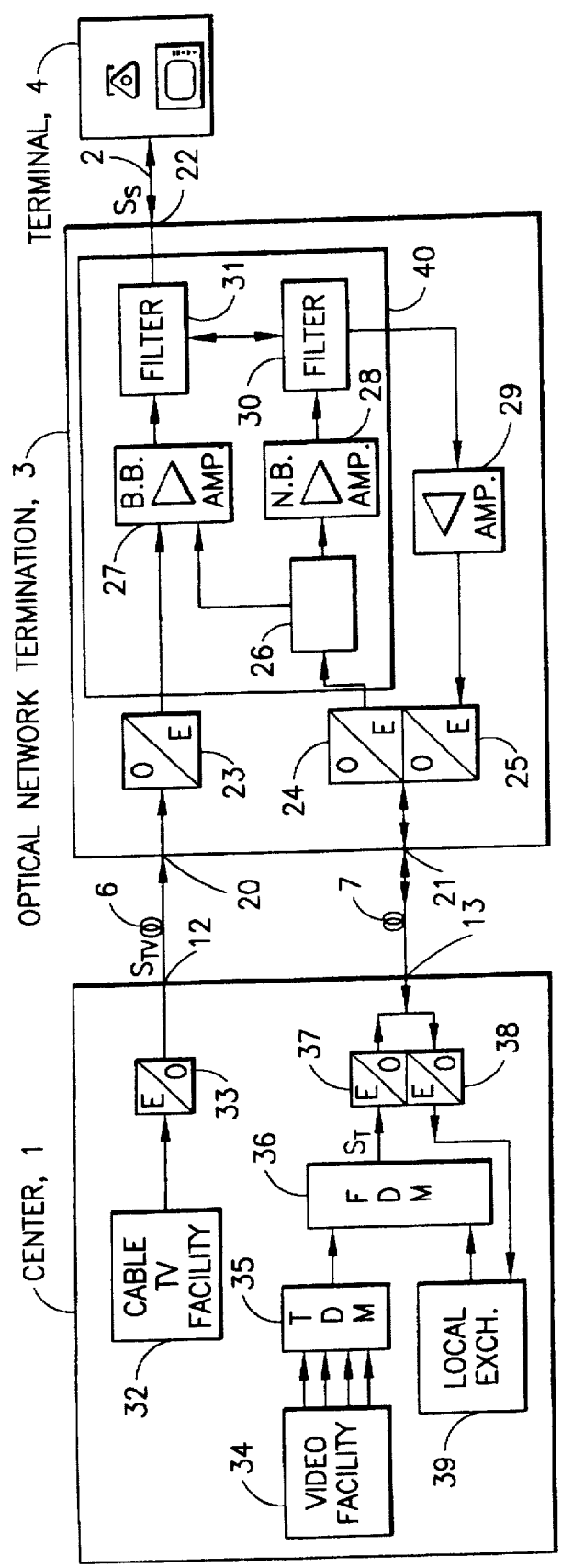
FIG. 1 shows a schematic optical transmission system with an optical network termination.

FIG. 1 shows a schematic optical transmission system for transmitting cable television signals and subscriber-assigned video and telecommunications signals. This optical transmission system comprises a center 1, two optical fibers 6, 7, an optical network termination 3, an electrical access network 2, and terminals 4 (telephone and/or television set) at the subscriber.

The optical fibers 6, 7 commonly contain branch points where the light propagating in the optical fiber 6, for example, is divided among several optical fibers which, in turn, are connected to respective optical network terminations. Signals sent out by the center 1 can also be transmitted over a common optical fiber using wavelength-division multiplexing. This is not shown in FIG. 1. The optical fibers 6, 7 form a fiber-optic distribution network.

The center 1 has an output 12 for light with which the cable television signal is transmitted. Connected to this output 12 is one end of the optical fiber 6, which has its other end connected to an input 20 of the optical network termination 3. Connected to a port 13 of the center 1 is one end of the optical fiber 7, which has its other end connected to a port 21 of the optical network termination 3. The ports 13, 21 are inputs and outputs, since light is transmitted in the optical fiber 7 in both directions. A further port 22 of the optical network termination 3 is also an input and output; this port 22 is connected to the electrical access network 2, to which terminals 4 of several subscribers are attached. FIG. 1 shows the terminals 4 of only one subscriber.

For the subscriber-assigned telecommunications signals, the center 1 is, for example, a local exchange which is connected to other exchanges of the public telecommunication network. The cable television signals $S_{TV}$ can be fed to the center 1 via a satellite receiving antenna or via optical fibers, for example.

The center 1 has a cable television facility 32, which makes cable television signals $S_{TV}$ available for transmission. An electrical-to-optical transducer 33 connected to the output 12 sends the cable television signals $S_{TV}$ as an optical signal to the optical network termination 3 over the optical fiber 6. The cable television signals $S_{TV}$ can be transmitted with light of a wavelength of, e.g., 1500 nm.

The center 1 further comprises a local exchange (OVST) 39 for the subscriber-assigned telecommunications signals. The operation of the local exchange 39 is generally known, so it need not be described.

A further function of the center 1 is to make available subscriber-assigned video signals. To this end, the center 1 comprises a video facility 34, a time-division multiplex facility 35, a frequency-division multiplex facility 36, and an electrical-to-optical transducer 37. An optical-to-electrical transducer 38 in the center 1 receives optical signals which are transmitted from the terminals 4 to the local exchange 39. The optical-to-electrical transducer 38 and the electrical-to-optical transducer 37 are connected to the port 13. The video facility 34 is a so-called video server.

If a subscriber requests a particular video film via a telephone link, the film will be made available by the video server. The video facility 34 (video server) has outputs for analog or digital signals.

The outputs (e.g., four outputs) of the video facility 34 are connected to the time-division multiplex facility 35, by which each video film is assigned one channel. The subscriber has access to the channel in which the requested film is transmitted. The video-signal-containing time-division multiplex signal provided by the time-division multiplex facility 35 is fed to the frequency-division multiplex facility 36. This frequency-division multiplex facility 36 combines the subscriber-assigned video signals (time-division multiplex signals) and the subscriber-assigned telecommunications signals from the local exchange 39 into a first frequency-division multiplex signal $S_T$, which is converted to a corresponding optical signal by the electrical-to-optical transducer 37. The first frequency-division multiplex signal $S_T$ is transmitted with light of a wavelength of, e.g., 1300 nm. Thus, according to the invention, the subscriber-assigned video signals and the subscriber-assigned telecommunications signals are transmitted as the first frequency-division multiplex signal $S_T$. The cable television signals $S_{TV}$ are not contained in this first frequency-division multiplex signal $S_T$.

The center 1 informs the subscriber on which channel and at what time the video film will be transmitted. It is also possible, of course, to transmit other types of subscriber-assigned signals, such as audio signals (music, lecture),to the subscriber on demand.

Every subscriber to the video-on-demand service selects and receives the video signal destined for him or her from the set of subscriber-assigned video signals which are distributed to a group of subscribers connected to an optical network termination 3.

The optical network termination 3, which is shown in greater detail, comprises the following parts:
two optical-to-electrical transducers 23, 24
one electrical-to-optical transducer 25
three amplifiers 27, 28, 29
three filter devices 26, 30, 31

Further parts, such as parts for controlling and monitoring the optical network termination 3, are not shown in FIG. 1. The amplifiers 27 and 28 and the three filter devices 26, 30, and 31 form a demultiplex and multiplex facility 40. The optical-to-electrical transducer 23 is connected to the input 20 and converts the light by which the cable television signals $S_{TV}$ are transmitted into a corresponding electric signal, which is fed to the amplifier 27. This amplifier 27 is a broadband amplifier, i.e., it has a uniform gain over a wide frequency range. The optical-to-electrical transducer 24 is connected to the port 21 and converts the light by which the first frequency-division multiplex signal $S_T$ (subscriber-assigned video and telecommunications signals) is transmitted into a corresponding electric signal, which is fed to the filter device 26. This filter device 26 is a combination of a high-pass filter and a low-pass filter. It separates the video signals from the telecommunications signals, acting as a splitter. To this end, the filter device 26 divides the electric signal coming from the optical-to-electrical transducer 24 between a first and a second signal path. The first signal path contains the high-pass filter which passes frequencies above a cutoff frequency chosen so that the video signals will reach the amplifier 27 unattenuated; the subscriber-assigned telecommunications signals are blocked. The second signal path contains the low-pass filter, which passes frequencies below a cutoff frequency. The telecommunications signals thus reach the amplifier 28, which is a narrow-band amplifier, as attenuated signals.

To enable this separation without loss of information, the frequency bands of the signals must be so defined that there is no band overlap. The frequency bands of the signals ("frequency plans") will be described with reference to FIG. 2.

The amplifier 27 combines and amplifies the cable television signals $S_{TV}$ and the video signals. The frequency bands of these two signals are so chosen as not to overlap. The amplifier 27 thus delivers a third frequency-division multiplex signal which is composed of the cable television signals $S_{TV}$ and the video signals, and which is fed to the filter device 31.

The telecommunications signals amplified by the amplifier 28 are applied to the filter device 31 through the filter device 30. The filter device 31 is also a combination of a high-pass filter and a low-pass filter. This filter device 31 is so designed that subscriber-assigned telecommunications signals coming from the port 22 are blocked by the high-pass filter contained in a first signal path, so that these signals cannot reach the first amplifier 27. The third frequency-division multiplex signal (cable-television and video signals) from the amplifier 27 is passed by the high-pass filter. Via a second signal path, which contains the low-pass filter, the subscriber-assigned telecommunications signals to be transmitted toward the center 1 reach the filter device 30, which is also a combination of a high-pass filter and a low-pass filter, with no attenuation.

The filter device 30 is designed to pass the subscriber-assigned telecommunications signals coming from the amplifier 28 to the filter device 31, and to pass the subscriber-assigned telecommunications signals to be transmitted toward the center 1 only to the amplifier 29. At the filter device 31 the third frequency-division multiplex signal and the subscriber-assigned telecommunications signals coming from the filter device 30 are combined into a second frequency-division multiplex signal $S_S$, which appears at the output 22. This second frequency-division multiplex signal $S_S$ contains all signals to be transmitted, and is transmitted through an electrical access network 2.

In the optical transmission system shown in FIG. 1, telecommunications signals, e.g., telephone and data signals, are also transmitted from the subscriber terminals 4 to the center (upstream). These signals also pass through the optical network termination 3. To this end, a separate signal path is provided for this direction. From the port 22 the telecommunications signals are passed through the two filter devices 31, 30 to the amplifier 29, from which they are applied to the electrical-to-optical transducer 25. The telecommunications signals, which are then present as an optical signal, leave the optical network termination 3 at the port 21.

Figure 2:
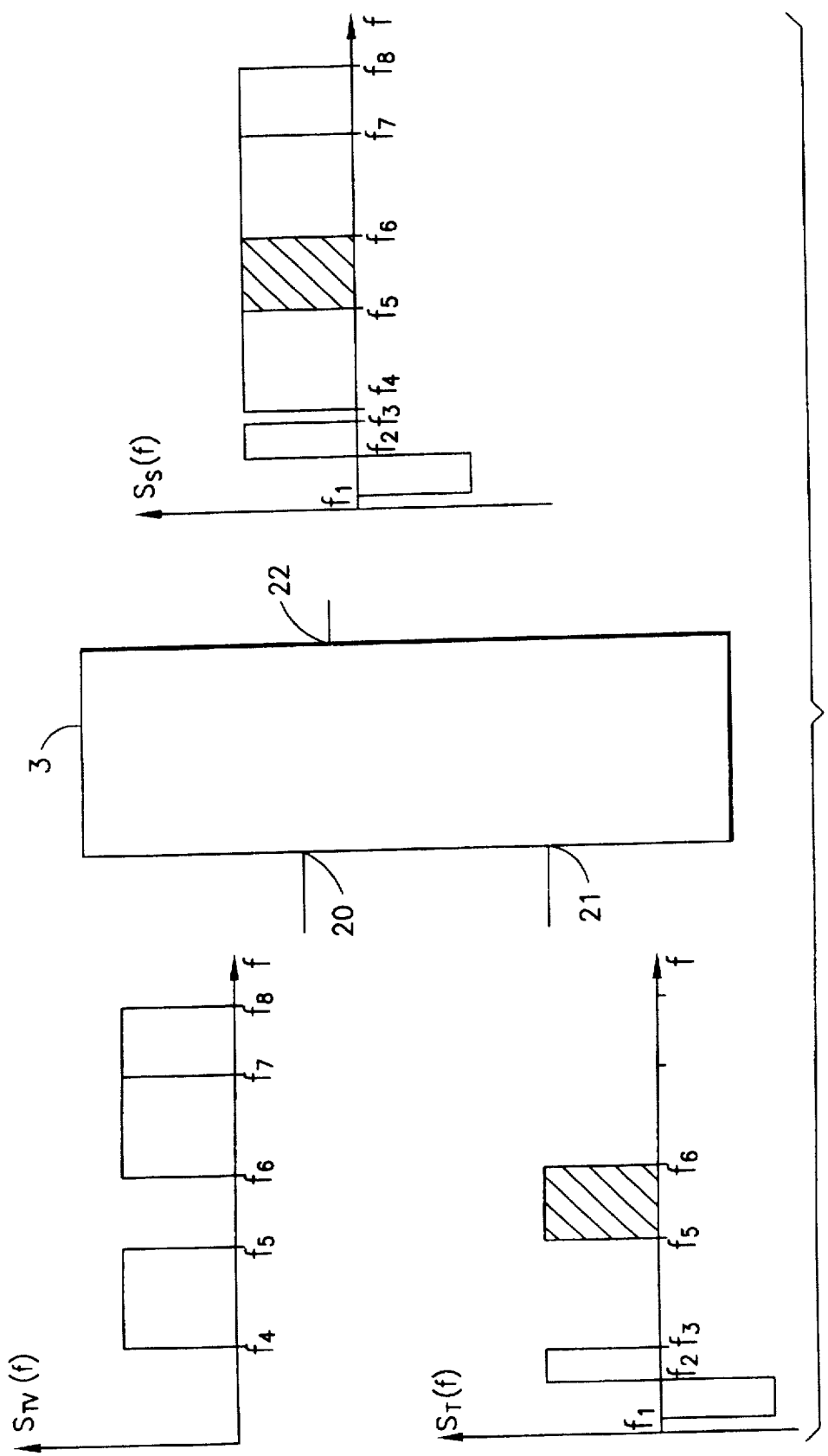
FIG. 2 shows a first survey of signals to be transmitted, which are plotted as a function of frequency.

FIG. 2 shows a survey of signals to be transmitted (cable television signals $S_{TV}$, subscriber-assigned video and telecommunications signals), which are plotted as a function of frequency. Such a representation will hereinafter be referred to as a "frequency plan". For a better understanding, the arrangement of the frequency plans is referred to the optical network termination 3 shown schematically in FIG. 2, i.e., the frequency plan of the cable television signals $S_{TV}$ is shown at the input 20, the frequency plan of the first frequency-division multiplex signal $S_T$ (subscriber-assigned video and telecommunications signals) at the port 21, and the frequency plan of the second frequency-division multiplex signal, which propagates through the access network 2, at the port 22.

In FIG. 2, the cable television signals are denoted by $S_{TV}$, the first frequency-division multiplex signal by $S_T$, and the second frequency-division multiplex signal, which propagates through the access network 2, by $S_S$. Frequencies $f_1$ to $f_8$ increase from $f_1$ to $f_8$. The first frequency plan, i.e., $S_{TV}(f)$, shows that the cable television signals have three frequency bands: A first frequency band extends between the frequencies $f_4$ and $f_5$, a second frequency band between the frequencies $f_6$ and $f_7$, and a third frequency band between the frequencies $f_7$ and $f_8$.

The second frequency plan, i.e., $S_T(f)$, shows that the first frequency-division multiplex signal $S_T$ (subscriber-assigned video and telecommunications signals) has three frequency bands: A first frequency band extends between the frequencies $f_1$ and $f_2$, a second frequency band between the frequencies $f_2$ and $f_3$, and a third frequency band between the frequencies $f_5$ and $f_6$ (this frequency band is shown hatched in FIG. 3). The first frequency band is assigned for the transmission of telecommunications signals to the center (upstream). To indicate that this band is for this direction of transmission, it is shown in the frequency plan with a negative amplitude. A further frequency band, which is assigned for monitoring the transmission, is not shown.

The third frequency plan, i.e., $S_S(f)$, shows that the signal propagating through the access network 2 results from a combination of all signals to be transmitted in the system. The frequencies $f_1$ to $f_8$ are so chosen as not to overlap, so that no information is lost.

The cable television signals $S_{TV}$ have the following frequency bands, for example:

AM VSB band from $f_4$=130 MHz to $f_5$=300 MHz
AM VSB band from $f_6$=450 MHz to $f_7$=600 MHz
DVB (NVOD) band from $f_7$=600 MHz to $f_8$=860 MHz In the frequency-division multiplex signals, the video signals occupy the frequency band extending from $f_5$=300 MHz to $f_6$=450 MHz, and the telecommunications signals occupy the frequency band below $f_4$=130 MHz.

The above frequency values are guide values to represent the frequency assignment. Adjacent frequency bands, such as AM VSB band and video-signal band ($f_5$) are, of course, so chosen as not to overlap; a sufficient frequency spacing is provided.

Figure 3:
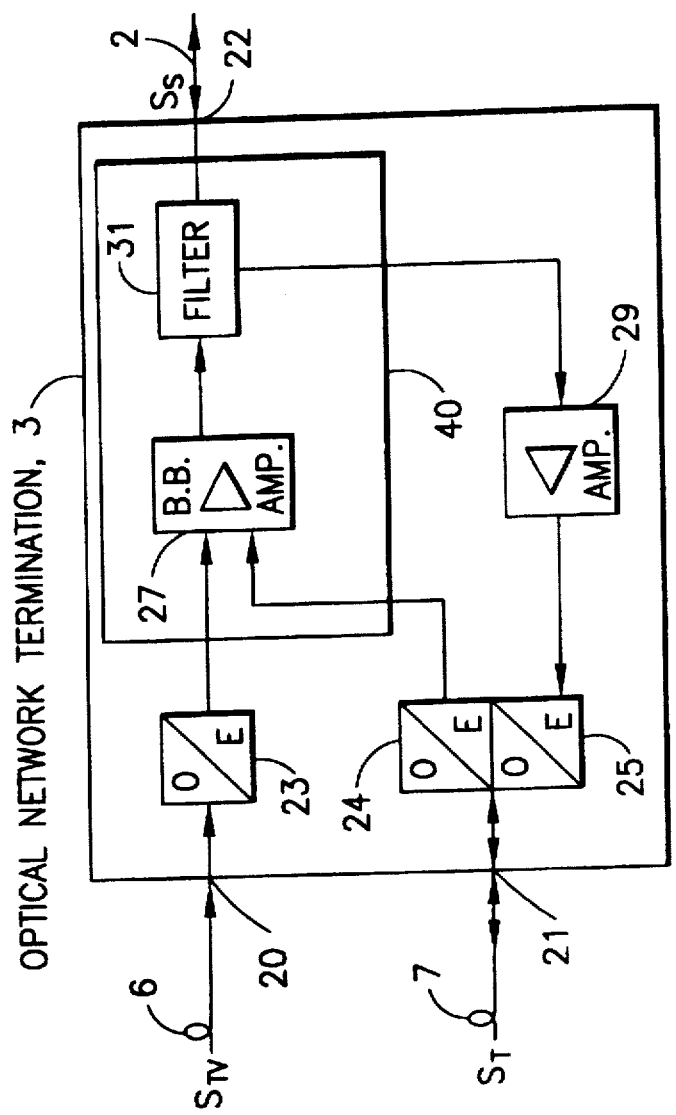
FIG. 3 shows another embodiment of an optical network termination.

FIG. 3 shows another embodiment of an optical network termination 3. It differs from the optical network termination 3 of FIG. 1 in that no filter devices 26, 30 and no amplifier 28 are present. The remaining parts of the optical network termination 3 of FIG. 3 are designated by the same reference characters as in FIG. 1.

The electric signal from the optical-to-electrical transducer 24 (electric frequency-division multiplex signal $S_T$) is fed directly to the amplifier 27, where it and the cable television signal $S_{TV}$ are combined and amplified. No amplifier 28 is needed in this embodiment.

This does not affect the transmission of the signals from the subscribers to the center 1: The amplifier 29 is connected directly to the filter device 31.

Figure 4:
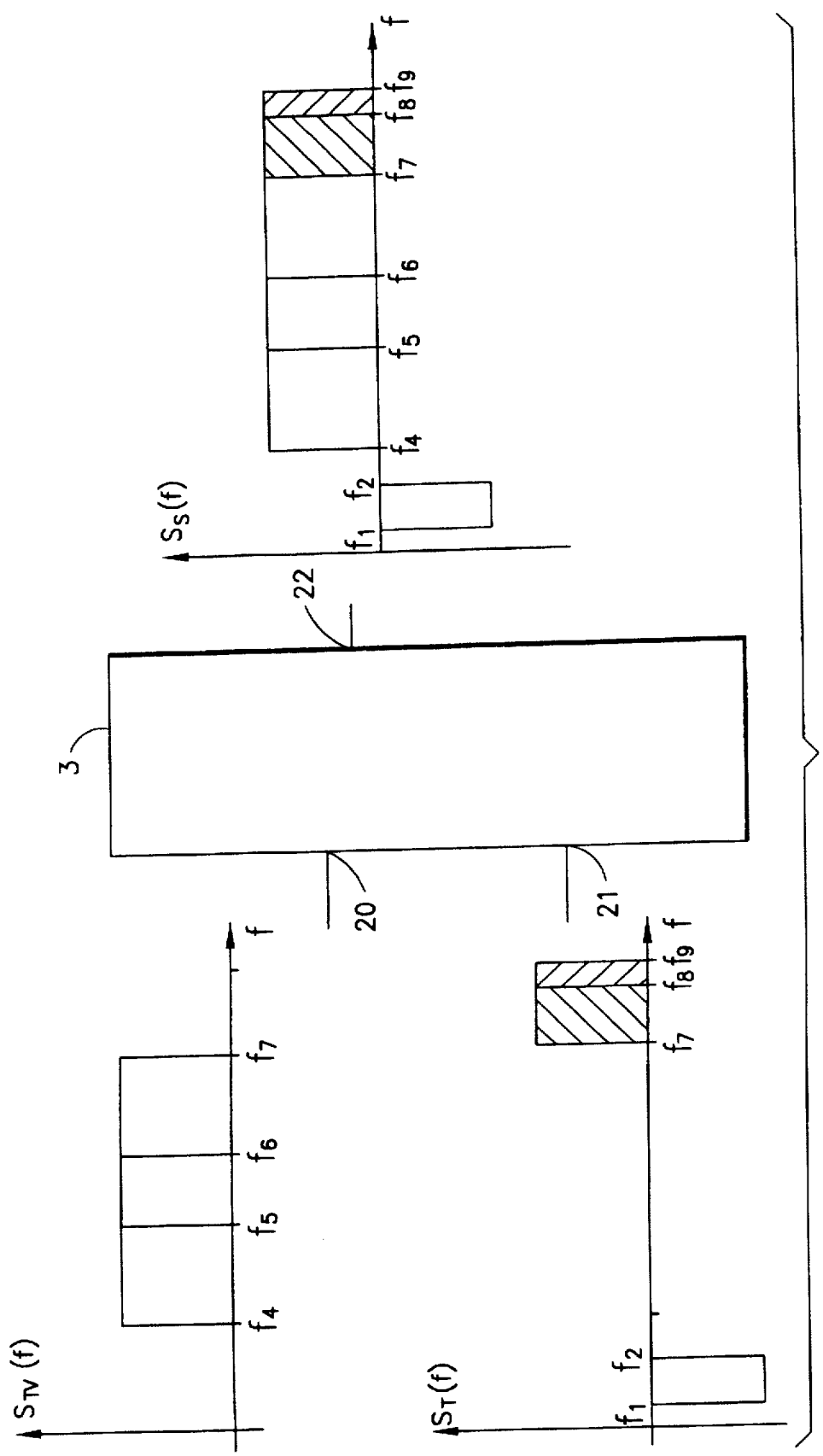
FIG. 4 shows a second survey of signals to be transmitted.

In order for the joint amplification of the cable television signal $S_{TV}$ and the subscriber-assigned video and telecommunications signals to be possible, the frequency bands must be chosen in accordance with the frequency plans shown in FIG. 4.

The representation of FIG. 4 is analogous to that of FIG. 2, and the same reference characters as in FIG. 2 are used.

The frequency plan $S_{TV}(f)$ for the cable television signal $S_{TV}$ occupies the frequency bands between $f_4$ and $f_5$, between $f_5$ and $f_6$, and between $f_6$ and $f_7$.

The frequency plan $S_T(f)$ for the subscriber-assigned video and telecommunications signals occupies the frequency bands between $f_1$ and $f_2$, between $f_7$ and $f_8$, and between $f_8$ and $f_9$.

The frequency plan $S_S(f)$ is the combination of all signals to be transmitted.

In the embodiment explained with reference to FIGS. 3 and 4, the subscriber-assigned video and telecommunications signals are in the frequency range above the cable television signals.

I claim:

1. An optical transmission system comprising
   a center (1) and at least one optical network termination (3) connected to the center by a fiber-optic network (6,7), a plurality of terminals (4) connected to the optical network termination (3), and means (32, 33) at the center for optically transmitting cable television signals ($S_{TV}$), wherein the center (1) includes further means (34, 35, 36, 37) for combining subscriber-assigned video signals and subscriber-assigned telecommunications signals into a first frequency-division multiplex signal ($S_T$) and transmitting the latter as an optical signal;

the optical network termination (3) includes a demultiplex and multiplex facility (40) for combining the optically transmitted cable television signals ($S_{TV}$) and the optically transmitted first frequency-division multiplex signal ($S_T$) into a second frequency-division multiplex signal ($S_S$) which is transmitted to the terminals (4) over an electrical access network (2); and wherein the demultiplex and multiplex facility (40) comprises first means (26, 27) which separate the subscriber-assigned video signals and the subscriber-assigned telecommunications signals and combine the cable television signals and the subscriber-assigned video signals into a third frequency-division multiplex signal, and second means (28, 30, 31) which combine the third frequency-division multiplex signal and the subscriber-assigned telecommunications signals into the second frequency-division multiplex signal ($S_S$).

2. An optical transmission system as claimed in claim 1, characterized in that the first means (26, 27) of the demultiplex and multiplex facility (40) consist of a first filter device (26) which separates the subscriber-assigned video signals and the subscriber-assigned telecommunications signal from the first frequency-division multiplex signal ($S_T$), and a first amplifier device (27) which amplifies the cable television signals ($S_{TV}$) and the subscriber-assigned video signals.

3. An optical transmission system as claimed in claim 1, characterized in that the second means (28, 30, 31) of the optical network termination (3) consist of a second amplifier device (28) which amplifies the subscriber-assigned telecommunications signals separated from the first frequency-division multiplex signal ($S_T$), a second filter device (30) which passes the amplified subscriber-assigned telecommunications signals, and a third filter device (31) which passes the third frequency-division multiplex signal and the subscriber-assigned telecommunications signals coming from the second filter device (30).

4. An optical network termination for an optical transmission system, comprising a demultiplex and multiplex facility (40) for combining optically transmitted cable television signals ($S_{TV}$) and an optically transmitted first frequency-division multiplex signal ($S_T$) consisting of subscriber-assigned video signals and subscriber-assigned telecommunications signals into a second frequency-division multiplex signal ($S_S$), which appears at an output (22) of the optical network termination (3), said demultiplex and multiplex facility (40) including first means (26, 27) which separate the subscriber-assigned video signals and the subscriber-assigned telecommunications signals and combine the cable television signals and the subscriber-assigned video signals into a third frequency-division multiplex signal, and second means (28, 30, 31) which combine the third frequency-division multiplex signal and the subscriber-assigned telecommunications signals into the second frequency-division multiplex signal ($S_S$).

5. An optical network termination as claimed in claim 4, characterized in that the first means (26, 27) of the demultiplex and multiplex facility (40) consist of a first filter device (26) which separates the subscriber-assigned video signals and the subscriber-assigned telecommunications signal from the first frequency-division multiplex signal ($S_T$), and a first amplifier device (27) which amplifies the cable television signals ($S_{TV}$) and the subscriber-assigned video signals.

6. An optical network termination as claimed in claim 4, characterized in that the second means (28, 30, 31) of the optical network termination (3) consist of a second amplifier device (28) which amplifies the subscriber-assigned telecommunications signals separated from the first frequency-division multiplex signal ($S_T$), a second filter device (30) which passes the amplified subscriber-assigned telecommunications signals, and a third filter device (31) which passes the third frequency-division multiplex signal and the subscriber-assigned telecommunications signals coming from the second filter device (30).

7. An optical network termination as claimed in claim 4, wherein the demultiplex and multiplex facility (40) includes means (27) for combining and jointly amplifying the first frequency-division multiplex signal ($S_T$) and the cable television signals ($S_{TV}$).

* * * * *

UNITED STATES PATENT AND TRADEMARK OFFICE
CERTIFICATE OF CORRECTION

PATENT NO. : 5,793,506
DATED : August 11, 1998
INVENTOR(S) : Schmid

It is certified that error appears in the above-identified patent and that said Letters Patent is hereby corrected as shown below:

On title page, item

[56] please insert --

U.S. PATENT DOCUMENTS

| | | | |
|---|---|---|---|
| 5,204,767 | April 20, 1993 | Nakata et al. | 359/125 |
| 5,060,310 | October 22, 1991 | Frisch et al. | 359/188 |
| 5,181,106 | January 19, 1993 | Sutherland | 358/86 |

FOREIGN PATENT DOCUMENTS

| | | |
|---|---|---|
| 4341423 | February 16, 1995 | GERMANY |
| 3935183 | January 17, 1991 | GERMANY |
| 3907497 | September 13, 1990 | GERMANY |
| 0201825 | November 20, 1986 | EUROPE |
| 4337135 | September 1, 1994 | GERMANY |
| 3913300 | October 25, 1990 | GERMANY |
| 3902746 | August 9, 1990 | GERMANY |
| 0380945 | January 12, 1990 | EUROPE -- |

Signed and Sealed this

Twenty-ninth Day of December, 1998

*Attest:*

BRUCE LEHMAN

*Attesting Officer*        *Commissioner of Patents and Trademarks*